(12) United States Patent
Ishii et al.

(10) Patent No.: US 8,780,214 B2
(45) Date of Patent: Jul. 15, 2014

(54) IMAGING APPARATUS USING SHORTER AND LARGER CAPTURING INTERVALS DURING CONTINUOUS SHOOTING FUNCTION

(75) Inventors: Hirofumi Ishii, Osaka (JP); Masatoshi Nakamura, Kyoto (JP); Ryo Hirota, Osaka (JP); Yasutoshi Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 524 days.

(21) Appl. No.: 13/102,222

(22) Filed: May 6, 2011

(65) Prior Publication Data
US 2011/0279691 A1 Nov. 17, 2011

(30) Foreign Application Priority Data
May 10, 2010 (JP) .................. 2010-107842

(51) Int. Cl.
*H04N 5/228* (2006.01)
*H04N 7/18* (2006.01)

(52) U.S. Cl.
USPC .................. 348/208.16; 348/142; 348/208.4; 348/222.1; 348/231.3

(58) Field of Classification Search
USPC ............................................ 348/208.16, 142
See application file for complete search history.

(56) References Cited

U.S. PATENT DOCUMENTS

| | | | | |
|---|---|---|---|---|
| 7,206,026 B2* | 4/2007 | Hsiung et al. | ......... | 348/441 |
| 7,522,188 B2* | 4/2009 | Tomita et al. | ......... | 348/208.11 |
| 8,204,355 B2* | 6/2012 | Saito et al. | ......... | 386/224 |
| 8,319,859 B2* | 11/2012 | Kim et al. | ......... | 348/231.99 |
| 8,395,671 B2* | 3/2013 | Kimura | ......... | 348/208.14 |
| 2005/0195285 A1* | 9/2005 | Ide | ......... | 348/208.99 |
| 2005/0285941 A1* | 12/2005 | Haigh et al. | ......... | 348/155 |
| 2006/0007327 A1* | 1/2006 | Nakamura et al. | ......... | 348/239 |
| 2008/0024619 A1 | 1/2008 | Ono | | |
| 2011/0193996 A1* | 8/2011 | Onoda et al. | ......... | 348/231.99 |
| 2013/0021487 A1* | 1/2013 | Ishino et al. | ......... | 348/220.1 |

FOREIGN PATENT DOCUMENTS

| | | |
|---|---|---|
| JP | 5-30458 | 2/1993 |
| JP | 2006-67452 | 3/2006 |
| JP | 2008-35028 | 2/2008 |
| JP | 2008-131572 | 6/2008 |
| JP | 2009-60355 | 3/2009 |

* cited by examiner

Primary Examiner — Ngoc-Yen Vu
(74) Attorney, Agent, or Firm — Panasonic Patent Center

(57) ABSTRACT

An imaging apparatus having a continuous shooting function includes an imaging unit configured to generate an image signal based on an optical signal of a subject, a storage unit configured to store an image file based on the image signal, a first detector configured to detect a motion of the imaging apparatus, and a controller configured to control a capturing interval of the imaging unit for capturing an image in a continuous shooting operation based on a detecting result of the first detector so that the capturing interval for a magnitude of the motion of the imaging apparatus which is larger than a predetermined value is shorter than the capturing interval for the magnitude of the motion of the imaging apparatus which is smaller than the predetermined value.

16 Claims, 8 Drawing Sheets

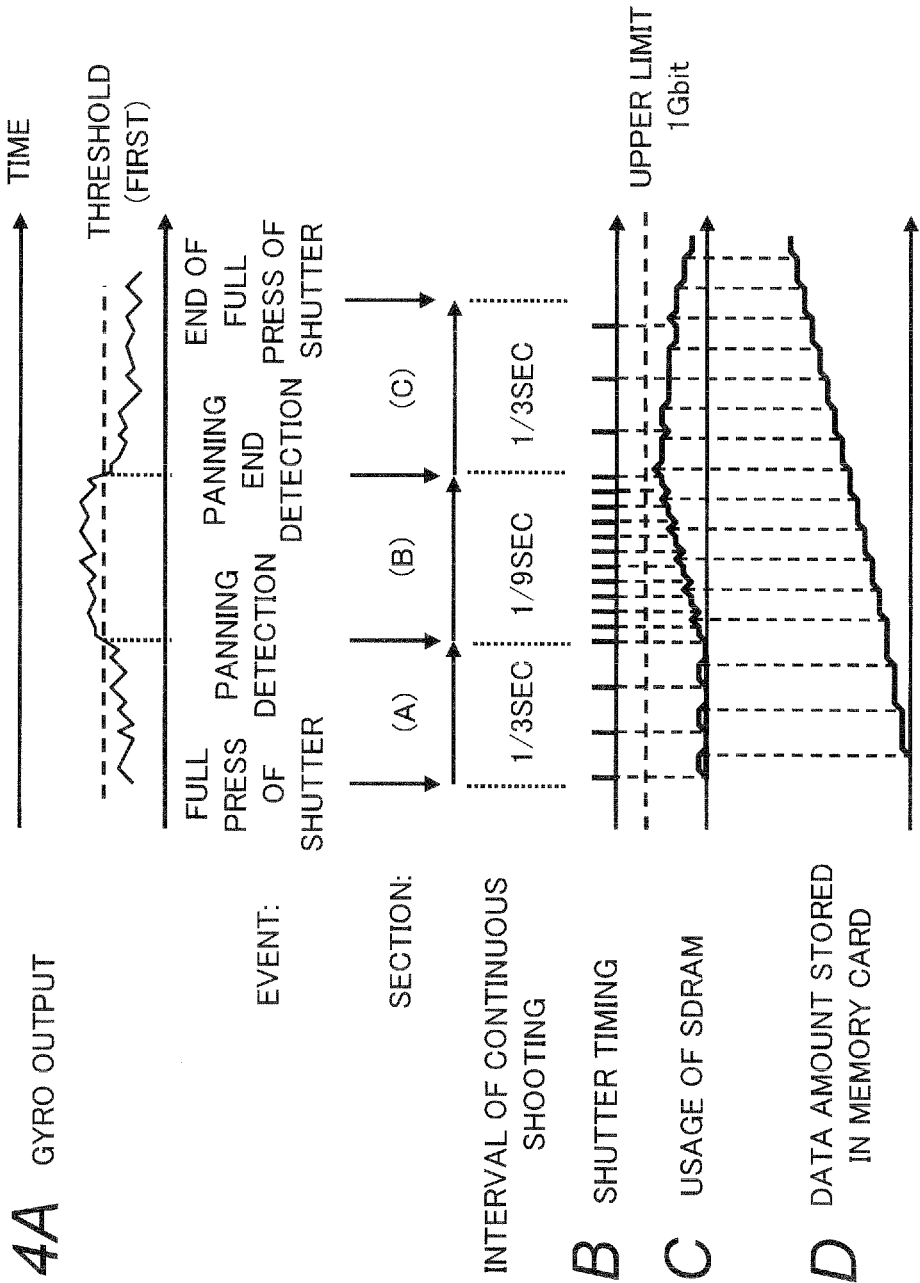

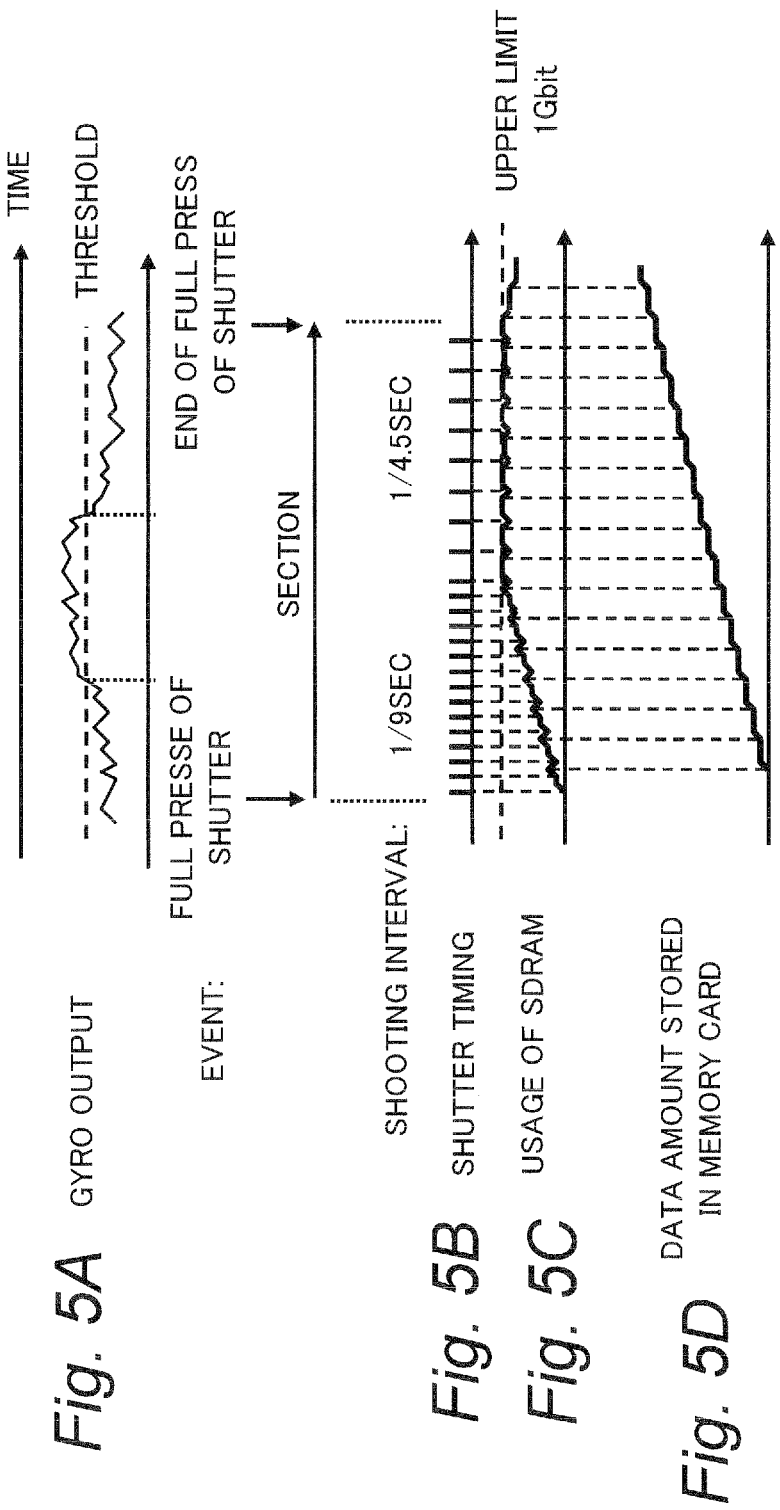

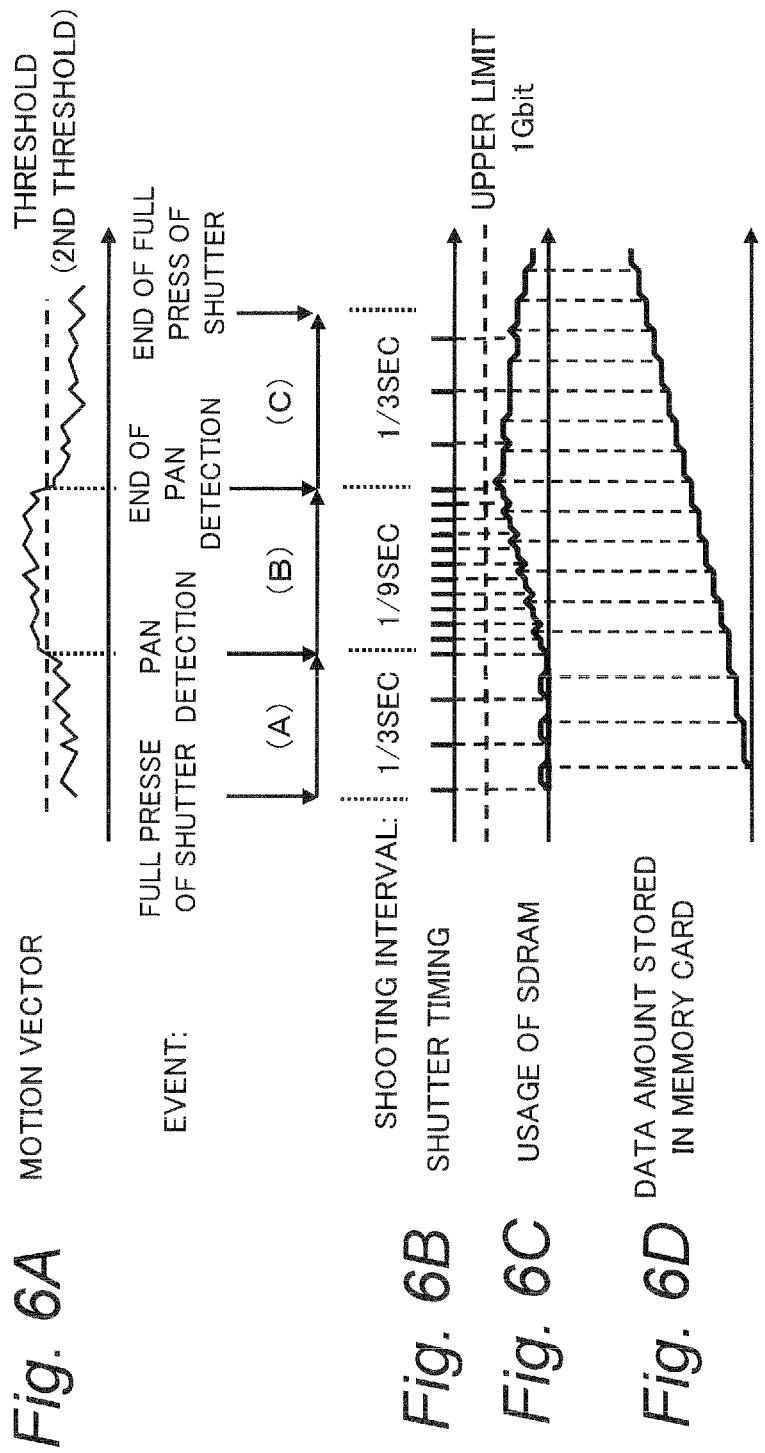

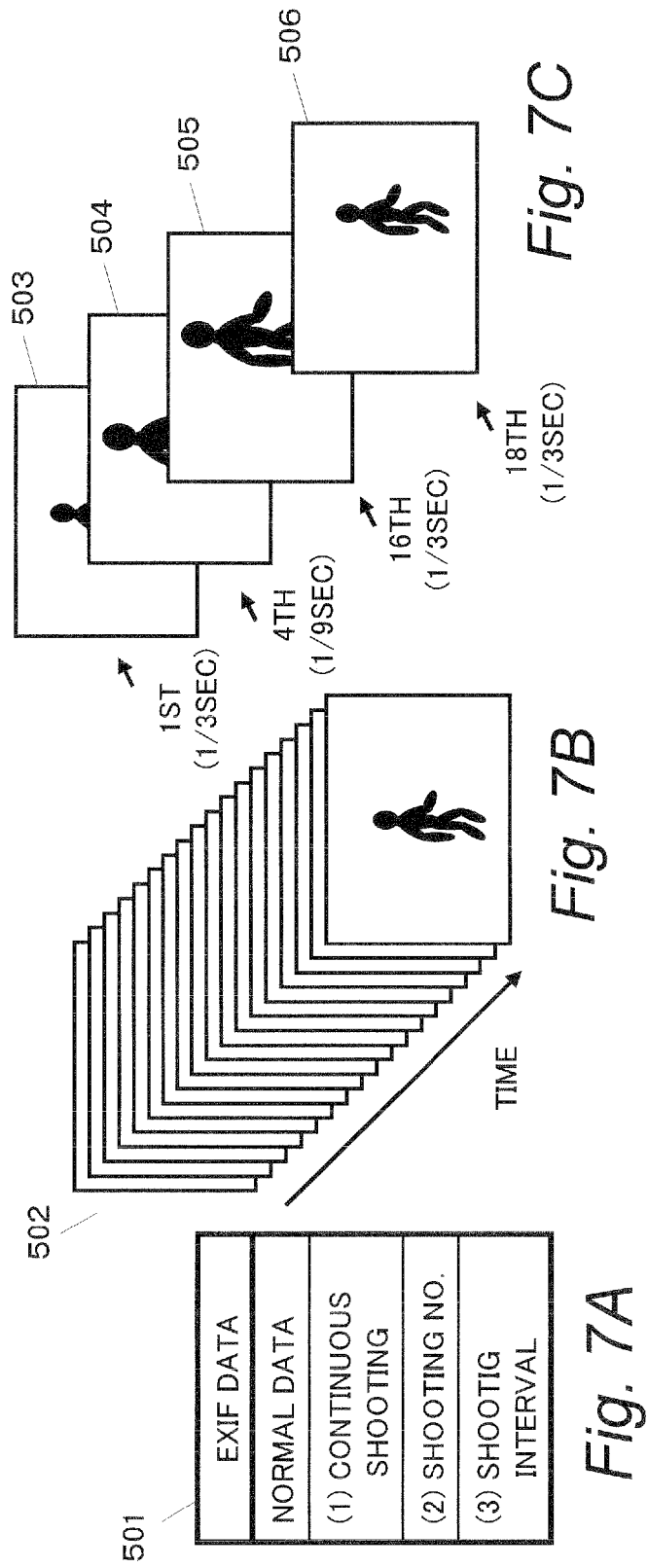

IMAGING APPARATUS USING SHORTER AND LARGER CAPTURING INTERVALS DURING CONTINUOUS SHOOTING FUNCTION

BACKGROUND

1. Technical Field

The technical field relates to an imaging apparatus that can perform a continuous shooting operation, and particularly to the imaging apparatus capable of automatically controlling an interval of the continuous shooting operation.

2. Related Art

A digital still camera that can record still images converts an optical image imaged on an imaging device such as a CCD or a CMOS through an optical system into an electric signal and further performs AD-conversion for the electric signal to generate a digital signal. The digital signal is converted from RAW data into YC data, and is subject to a JPEG compressing process so as to be recorded in an external flash memory such as a memory card.

Recently, digital still cameras that can perform high-speed continuous shooting at an interval of a several shots to several dozens shots per second have come to the market. Such digital still cameras have various functions. These functions enable continuous shooting of people who enjoy sports, moving animals, cars and airplanes, and enable users to select best shots from a plurality of recorded images continuously shot, and display a plurality of arranged images so as to enable the users to view them.

Regarding the continuous shooting function of imaging apparatuses, there is an imaging apparatus that detects a motion of a subject from an image and changes an interval for capturing an image in the continuous shooting according to the speed of the motion of the subject (for example, see Japanese patent application publication No. JP2009-060355A).

In a digital still camera that can perform high-speed continuous shooting, the high-speed continuous shooting can be performed generally until capacity of a storage medium (DRAM) is allowed. However, when the storage medium has no free space, a continuous shooting speed is limited to a speed regulated by a speed of writing data from the recording medium to the memory card. Therefore, the high-speed continuous shooting can be performed continuously for only one to several seconds after starting the continuous shooting, and thereafter the continuous shooting speed becomes enormously slow. For this reason, users may occasionally miss the best shots when a subject that moves quickly such as a person playing a sport is continuously shot. Further, there is a digital still camera that has a function with which a user can set a continuous shooting interval (the continuous shooting speed) in advance. However a moving speed of the subject cannot be frequently predicted, and therefore, such digital still camera is difficult to use.

The above problem can be solved to a certain extent by using a recording medium of which writing speed is high, such as a memory card. In this case, however, since a lot of pieces of image data are recorded in the recording medium such as a memory card, a high-capacity recording medium that is comparatively expensive is necessary. Further, users' burden increases for searching for desired images from a lot of pieces of recorded image data after recording images.

JP2008-131572A discloses a technique that saves capacity of a recording medium for recording video signals. According to JP2008-131572A, a motion of a subject is detected from an image, and when a magnitude of the motion is not more than a predetermined threshold, a recording interval is lengthened, while when the magnitude of the motion is more than the threshold, the recording interval is shortened, so that the capacity of a recording medium can be saved.

JP2008-131572A relates to a monitoring camera having a moving image capturing unit and a recording unit, and its object is to control the recording interval in a long term recording so as to save the entire capacity of the recording medium. However, a capturing interval in the continuous shooting function is not controlled. Therefore, JP2008-131572A does not provide a method for solving the above problem relating to the continuous shooting operation.

JP2009-060355 discloses a technique that can save a capacity of a film medium in a film camera having a film auto-feeding unit. In JP2009-060355A, a sensor for image processing is provided in addition to an imaging unit for film, a motion of a subject is detected by an image process of the sensor, and the capturing interval for continuous shooting is controlled according to the detected motion so that capacity of a film medium can be saved.

However, in the configuration to detect the motion of a subject from a captured image like JP2009-060355A, the motion can be detected only after the image is captured, thereby arising a problem of a response. In an image such as a night view from which the motion is hard to be recognized, the motion cannot be accurately detected. That is to say, JP2009-060355A has a problem in achieving quick and accurate control of the capturing interval at the continuous shooting.

At the continuous shooting, user's camerawork (actual camera motion) is one of important elements for capturing a preferable image. JP2009-060355A detects a motion of a subject in an image and does not detect an actual motion of the camera, and thus the user's camera work (panning) is not taken into consideration, thereby arising a problem in capturing a preferable image according to the motion of a subject.

SUMMARY

To solve the above problem, an object is to provide an imaging apparatus that can record preferable continuous shots for a moving subject while repressing an increase in a capacity of recorded images in the continuous shooting.

The imaging apparatus has a continuous shooting function, and includes an imaging unit configured to generate an image signal based on an optical signal of a subject, a storage unit configured to store an image file based on the image signal, a first detector configured to detect a motion of the imaging apparatus, and a controller configured to control a capturing interval of the imaging unit for capturing an image in a continuous shooting operation based on a detecting result of the first detector so that the capturing interval for a magnitude of the motion of the imaging apparatus which is larger than a predetermined value is shorter than the capturing interval for the magnitude of the motion of the imaging apparatus which is smaller than the predetermined value.

The image file may include a data section and a header section. The controller may generate the image file by storing image data based on the image signal in the data section and storing information relating to the capturing interval at generating the image signal in the header section, and store the generated image file in the storage unit.

The imaging apparatus may further include a second detector configured to detect a difference between images represented by image signals which are generated temporarily and continuously (for example, motion vector detection or motion detection based on brightness). The controller may control the capturing interval in the continuous shooting operation based on a detecting result of the second detector so that the capturing interval of the imaging unit in the continuous shooting operation when the difference between the images is larger than a predetermined value is shorter than the capturing interval when the difference between the images is smaller than the predetermined value.

The imaging apparatus may further include a display unit configured to display the image based on the image signal. At reproducing of a series of image signals which are continuously generated by the continuous shooting function, the controller may control the display unit to sequentially display at least a part of all images based on the series of image signals at the same capturing interval as the capturing interval at generating the image signals.

The at least a part of all images may include an image based on an image signal generated first in the plurality of images based on the series of image signals continuously generated by the continuous shooting function, an image based on an image signal generated last and an image based on an image signal generated when the capturing interval changes.

According to the above imaging apparatus, a capturing interval for capturing an image in the continuous shooting operation can be controlled most suitably according to a magnitude of the motion of the imaging apparatus caused by user's camera work. Concretely, when the motion of the imaging apparatus (for example, a panning speed) is larger than a predetermined value, the capturing interval is further shortened, and when the motion is smaller than the predetermined value, the capturing interval is further lengthened. When a moving subject is continuously shot, the continuous shooting which can trace the motion of the subject is suitably achieved by controlling the capturing interval, so that miss of the best shot is reduced. As a result, the imaging apparatus that copes with a photo opportunity can be provided.

Information relating to the capturing interval or the like may be recorded in the header section of the image file. A representative image can be easily selected by referring to this information, thereby improving performance of retrieval function and one-look visibility of the representative image. As a result, user's convenience at the time of the image retrieval and the viewing can be improved.

BRIEF DESCRIPTION OF DRAWINGS

FIGS. 4A to 4D are diagrams for describing control of a continuous shooting interval according to a panning speed (a motion amount of camerawork) by means of the digital still camera according to the embodiment.

FIGS. 5A to 5D are diagrams for describing the control of the continuous shooting interval by means of a conventional digital still camera.

FIGS. 6A to 6D are diagrams for describing the control of the continuous shooting interval by means of the digital still camera according to a motion (a motion vector) of the subject according to the embodiment.

FIGS. 7A to 7D are diagrams for describing recording of Exif data and reproducing of a representative image in the digital still camera according to the embodiment.

DETAILED DESCRIPTION OF PREFERRED EMBODIMENTS

Preferred embodiments will be described below with reference to the drawings.

First Embodiment

1. External Appearance of Digital Still Camera

Figure 1B:
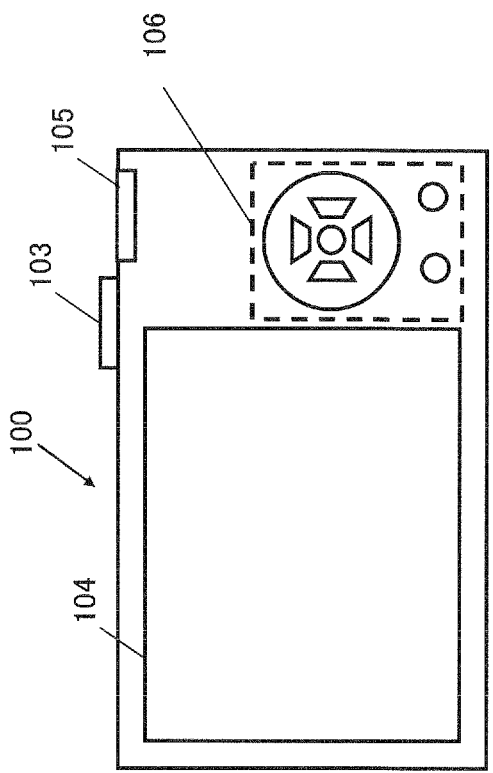
FIGS. 1A and 1B are external views illustrating a digital still camera according to an embodiment.
Figure 1A:
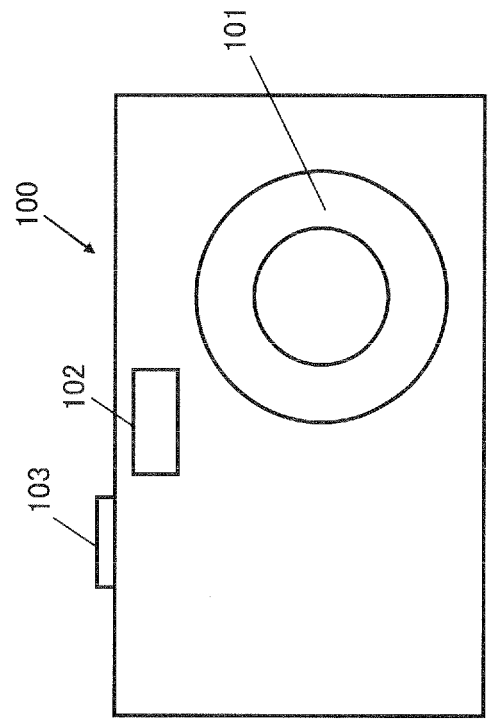

FIGS. 1A and 1B are external views illustrating a digital still camera according to the first embodiment. FIG. 1A is a front view, and FIG. 1B is a rear view.

An imaging optical system 101 and a flash 102 are arranged on a front surface of a digital still camera 100 (see FIG. 1A). The imaging optical system 101 images a subject image on an imaging device in the digital still camera 100. The flash 102 emits flash light to compensate for deficiency of a light amount required for capturing an image in a dark environment. A shutter button 103 is arranged on an upper surface of the digital camera 100. When the shutter button 103 is pressed down, image data based on a subject image imaged on the imaging device is recorded in a recording medium such as a memory card.

A liquid crystal display (LCD) monitor 104, a mode dial 105, and various operation buttons 106 are arranged on a rear surface of the digital still camera 100 (see FIG. 1B). An image based on the subject image imaged on the imaging device is displayed on the LCD monitor 104. Hence, a composition for photography can be determined while the image displayed on the LCD monitor 104 is being observed. Further, the LCD monitor 104 can display an image based on the image data recorded in the recording medium.

An operation mode of the digital still camera 100 can be determined by operating the mode dial 105. The operation mode of the digital still camera 100 includes a recording mode and a reproducing mode. The recording mode is an operation mode for recording the image data based on the subject image imaged on the imaging device in the recording medium such as the memory card. In the recording mode, when the shutter button 103 is pressed down, the image data based on the subject image imaged on the imaging device is recorded in the recording medium. The recording mode is subdivided into a full automatic recording mode, a program recording mode, a shutter speed priority recording mode, an aperture priority recording mode, and a scene dependent recording mode. The scene dependent recording mode includes a high-speed continuous shooting mode.

The reproducing mode is an operation mode for displaying an image based on the image data recorded in the recording medium on the LCD monitor 104. Operation of the various operation buttons 106 enables more detailed settings in the recording mode and the reproducing mode. Concretely, in the recording mode, the settings relating to exposure correction, white balance adjustment, and light emission of the flash 102 can be carried out. Further, in the reproducing mode, it is possible to carry out enlargement/reduction of image displayed on the LCD monitor 104, setting of a number of images to be simultaneously displayed on the LCD monitor 104, and retrieving of the image data recorded in the recording medium such as the memory.

2. Configuration of Digital Still Camera

Figure 2:
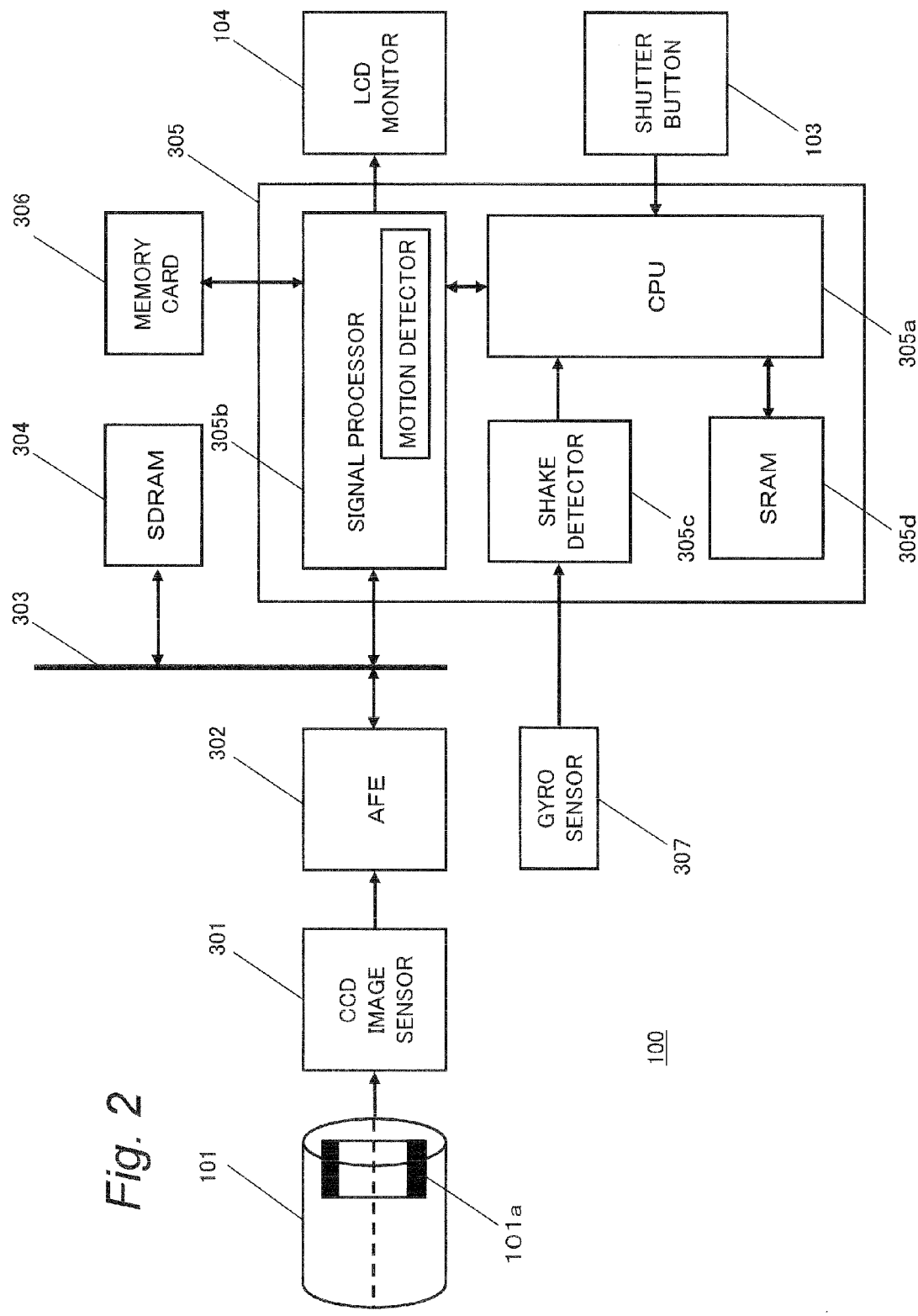
FIG. 2 is a block diagram illustrating the digital still camera according to the embodiment.

FIG. 2 is a block diagram illustrating the digital still camera 100 according to the first embodiment. The imaging optical system 101 includes a plurality of lens groups, and images subject light on a CCD image sensor 301 as an imaging device. In the digital still camera 100 according to the first embodiment, a shutter device 101a is arranged in the imaging optical system 101.

The CCD image sensor 301 generates an analog image signal based on the imaged subject light to output the analog image signal. An AFE 302 converts the analog image signal output from the CCD image sensor 301 into image data as a digital signal, and stores the image data in an SDRAM 304 via a bus 303. In the first embodiment, the CCD image sensor 301 is described as the imaging device, but another imaging device such as a CMOS image sensor may be used.

A signal processing LSI 305 includes a CPU 305a, a signal processor 305b, a vibration detector 305c, and a SRAM 305d. The CPU 305a controls entirely the digital still camera 100. The CPU 305a can control an operation of the shutter device 101a. The signal processor 305b converts the image data stored in the SDRAM 304 by the AFE 302 into the image data suitable for displaying on the LCD monitor 104, and outputs the image data to the LCD monitor 104.

In recording modes other than the high-speed continuous shooting mode, half-pressing of the shutter button 103 starts a focusing operation, and full-pressing of the shutter button 103 performs shooting of an image. When the image data stored in the SDRAM 304 is the image data stored by the full-pressing of the shutter button 103, the signal processor 305b converts the image data into image data suitable for recording in a memory card 306, and records the converted image data in the memory card 306. The image data recorded in the memory card 306 is converted into the image data suitable for displaying on the LCD monitor 104 by the signal processor 305b, and is displayed on the LCD monitor 104.

In the high-speed continuous shooting mode, a plurality of images are continuously shot after the shutter button 103 is fully pressed and until the full-pressing is released. A method for determining a shooting interval for that operation will be described later. During the continuous shooting operation, the captured image data is stored in the SDRAM 304. The image data stored in the SDRAM 304 is converted into image data suitable for recording in the memory card 306 similarly to the recording modes other than the high-speed continuous shooting mode, and is recorded in the memory card 306. Therefore, in the high-speed continuous shooting mode, a plurality of pieces of image data are continuously recorded in the memory card 306 during a period from full-pressing of the shutter button 103 to release of the full-pressing of the shutter button 103. The focusing operation may be performed only once or every time an image is shot, during a period from the half-pressing of the shutter button 103 to the full-pressing of the shutter button 103.

A gyro sensor 307 outputs a vibration signal corresponding to vibration (angular velocity) of the digital still camera 100. The vibration detector 305c outputs the vibration signal output from the gyro sensor 307 to the CPU 305a.

3. Operation

3-1. Control of Continuous Shooting Interval Based on Motion Amount of Camera With reference to FIGS. 3A to 3C, control for changing a capturing interval for capturing an image in continuous shooting operation (hereinafter "a continuous shooting interval") according to a panning speed of the digital still camera 100 in the first embodiment will be described. In the digital still camera 100 according to the first embodiment, during the high-speed continuous shooting mode, the continuous shooting interval is automatically controlled based on the panning speed, namely, motion amount of the digital still camera 100.

Figure 3A:
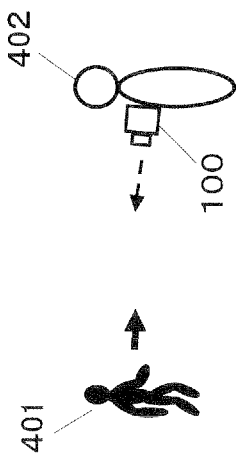
FIGS. 3A to 3C are diagrams for describing a moving subject and a state that the digital still camera is panned according to the motion.
Figure 3B:
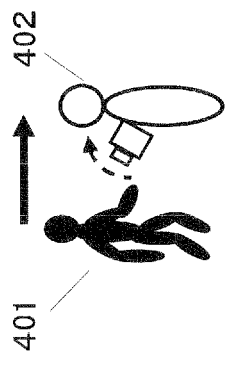
Figure 3C:
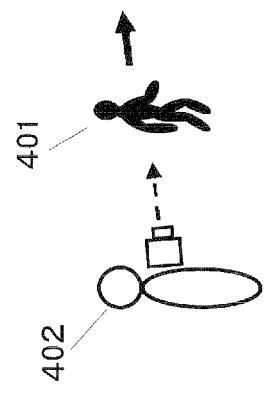

FIGS. 3A, 3B and 3C illustrate a change in a situation when continuously shooting a running subject. That is to say, FIGS. 3A, 3B and 3C describe a state that a user 402 continuously shoots a subject 401 approaching to the user 402 from a distance and passing in front of the user 402. In the drawings, the arrows indicated by sold lines show an advancing direction of the subject 401, and arrows indicated by broken lines show a shooting orientation of the digital still camera 100.

In the state of FIG. 3A, the subject 401 moves to the advancing direction (the direction of the arrow of the sold line). But since a distance between the subject 401 and the user 402 is long, the user 402 can shoot the subject 401 with hardly moving the digital still camera 100. Therefore, the shooting orientation hardly changes. Thereafter, as shown by the arrow of the broken line in FIG. 3B, when the subject 401 comes sufficiently close to the user 402 and passes the user 402, the user 402 broadly moves and pans the digital still camera 100 according to the motion of the subject 401. Thereafter, as shown in FIG. 3C, when the subject 401 runs off, the subject 401 is again far. For this reason, the user 402 hardly moves the digital still camera 100, and thus the shooting orientation of the digital still camera 100 hardly changes.

FIGS. 4A to 4D illustrate a temporal change in an operating state of the digital still camera 100 when image shooting is performed with the above camerawork. FIG. 4A illustrates temporal change in an output from the gyro sensor 307. FIG. 4B illustrates a shutter timing of the continuous shooting. FIG. 4C illustrates a temporal change in usage of the SDRAM 304. FIG. 4D illustrate a temporal change in the time change of a data storage amount of the memory card 306.

in the first state shown in FIG. 3A (a section A), the shooting orientation hardly moves. For this reason, as shown in FIG. 4A, the output from the gyro sensor 307 is equal to or less than a threshold (a first threshold). In this case, the CPU 305a does not detect the panning of the digital still camera 100. As shown in FIG. 33, when the digital camera is panned by broadly moving the shooting orientation of the digital still camera 100 (a section B), the output from the gyro sensor 307 exceeds the threshold, and thus the CPU 305a detects the panning. Thereafter, in the state of FIG. 3C (a section C), the shooting orientation of the digital still camera 100 again hardly moves. At this time, the output from the gyro sensor 307 is equal to or less than a threshold 408, and thus the CPU 305a detects end of the panning. These control events (the detection of the panning and the detection of the end of the panning) divide the continuous shooting interval from the full-pressing of the shutter to the end of the full-pressing into the sections A to C according to the state changes in FIGS. 3A to 3C.

The CPU 305a controls the continuous shooting interval according to the control event (namely, the motion of the digital still camera 100) which is determined based on the output from the gyro sensor 307. Concretely, in the section A and the section C where the panning is not detected, the continuous shooting interval is controlled to an interval of 1/3 sec, and in the section B where the panning is detected, the continuous shooting interval is controlled to an interval of 1/9 sec.

FIG. 4C illustrates the state of the usage of the SDRAM 304. The SDRAM 304 has the maximum capacity of 1 Gbit, and can store eight pieces of image data maximally.

FIG. 4D illustrates the temporal change in amount of the data stored in the memory card 306. It takes 4.5 sec to write one piece of image data to the memory card 306. When the writing of one piece of the image data to the memory card 306 is completed, the SDRAM 304 can release a memory space for one piece of the image data.

In the first section A, the continuous shooting interval is 1/3 sec which is longer than the writing time 1/4.5 sec for writing one piece of image data to the memory card 306. For this reason, the image data stored in the SDRAM 304 is immediately written to the memory card 306, so that one or more pieces of image data are not stored in the SDRAM 304, as shown in FIG. 4C.

In the next section. B, the continuous shooting interval is 1/9 sec which is shorter than the writing time 1/4.5 sec for writing one piece of image data to the memory card 306. For this reason, image data that cannot be written to the memory card 306 during the continuous shooting is cumulatively stored in the SDRAM 304, as shown in FIG. 4C.

In the next section C, the continuous shooting interval is again 1/3 sec which is longer than the writing time 1/4.5 sec for writing one piece of image data to the memory card 306. For this reason, the captured image data as well as the image data stored in the SDRAM 304 is written to the memory card 306. For this reason, a data amount of the image data stored in the SDRAM 304 is reducing as shown in FIG. 4C.

As described above, when the panning is detected, the continuous shooting interval is controlled so as to be shorter. With this control, the digital still camera 100 can shoot an important scene where the subject is passing in front of the user 402 at the short continuous shooting interval (for example, 1/9 sec).

FIGS. 5A to 5D are diagrams describing an operation in a case of continuous shooting by a conventional digital still camera that controls the continuous shooting interval. FIGS. 5A to 5D show the same items in FIGS. 4A to 4D.

The conventional digital still camera performs continuous shooting at the continuous shooting interval of 1/9 sec simultaneously with the full-pressing of a shutter. Since the writing of one piece of image data to the memory card 306 takes 1/4.5 sec, the SDRAM 304 becomes full during the continuous shooting. Thereafter, the shooting can be performed only every time the writing of one piece of image data to the memory card is completed. For this reason, the shooting is performed at the interval of 1/4.5 sec.

Therefore, with the conventional digital still camera, it is more likely that the important scene where the subject 401 is passing in front of the user 402 cannot be continuously shot at the short continuous shooting interval of 1/9 sec.

Furthermore, the SDRAM is nearly full for a while, even after the end of the continuous shooting, and thus when the next continuous shooting is started immediately after the end of the previous continuous shooting, it is more likely that the SDRAM becomes immediately full. Specifically, when the continuous shooting is started in a state that the usage of the SDRAM is small, it takes a while for the SDRAM to be full. However, when the continuous shooting is started in a state that the SDRAM is nearly full, it takes a shorter time for the SDRAM to be full than the case where the continuous shooting is started with the small usage of the SDRAM. As a result, a period of time for which the shooting can be performed at the short continuous shooting interval of 1/9 sec becomes shorter.

As stated above, in the conventional digital still camera, the continuous shooting may often not be performed at the short continuous shooting interval (namely, the high continuous shooting speed) at the time of an important photo opportunity. On the contrary, the digital still camera 100 according to the first embodiment can solve this problem, and has high usability.

3-2. Control of Continuous Shooting Interval Based on Motion Amount of Subject

In the above description, the continuous shooting interval is controlled by using a result of detecting the actual motion of the digital still camera 100 (a result of detecting the panning with the gyro sensor 307). However, the continuous shooting interval may be controlled based on other information. In the first embodiment, a motion amount of a subject (a motion vector) is detected from an image, and the continuous shooting interval is controlled based on the detected motion amount. For that purpose, in the first embodiment, the signal processor 305b contains a circuit for calculating a motion vector from a difference between image data stored in the SDRAM 304 (namely, the motion amount of the subject) in the high-speed continuous shooting mode. An operation of this case will be described below with reference to FIGS. 6A to 6D.

The signal processor 305b calculates a first motion vector based on a difference between image data first stored in the SDRAM 304 and image data secondary stored in the SCRAM 304 during the high-speed continuous shooting mode. The signal processor 305b calculates a second motion vector based on a difference between the image data secondary stored in the SDRAM 304 and image data thirdly stored in the SDRAM 304 during the high-speed continuous shooting mode. Hereinafter, similarly the signal processor 305b calculates a third motion vector, a fourth motion vector, etc. until the full-pressing of the shutter button 103 is ended.

The CPU 305a compares a magnitude of the motion vector with a predetermined threshold (hereinafter, "a second threshold") every time the signal processor 305b calculates the motion vector.

When the motion amount of the subject between image data is small, the magnitude of the motion vector is small and does not exceed the second threshold, and thus the CPU 305a controls the continuous shooting interval to 1/3 sec (section A in FIG. 6A). When the motion amount of the subject between the image data becomes large, the magnitude of the motion vector becomes large and exceeds the second threshold. As a result, the CPU 305a controls the continuous shooting interval to 1/9 sec (section B in FIG. 6B). Thereafter, when the motion amount of the subject between the image data becomes small, the magnitude of the motion vector becomes small and is less than the predetermined threshold so that the CPU 305a again controls the continuous shooting interval to 1/3 sec (a section C in FIG. 6A). The timing at which the magnitude of the motion vector exceeds the predetermined threshold is a timing at which the control event of panning detection occurs similarly to the case described with reference to FIGS. 4A to 4D. The timing at which the magnitude of the motion vector is less than the predetermined threshold is at a timing at which the control event of detecting the end of the panning occurs.

Such a control enables the digital still camera 100 to perform the continuous shooting at the short continuous shooting interval of 1/9 sec during a period for which the motion amount of the subject is large, so that a case where the user misses a photo opportunity, namely, the best shot is reduced.

In the first embodiment, change of the continuous shooting interval based on the detection of the panning based on the output from the gyro sensor (the motion amount of the camerawork), and change of the continuous shooting interval based on the motion amount of the subject (the motion vector) detected from the image are carried out with the both changes combined. As the combination, a logical product and a logical sum are considered, but another combination may be used. For example, in case of the combination with the logical product, when the output from the gyro sensor 307 is larger than the threshold (the first threshold) and the magnitude of the motion vector is larger than the second threshold, the continuous shooting interval may be controlled to 1/9 sec. On the other hand, in case of the combination with the logical sum, when at least one of the following two conditions is true, the continuous shooting interval is controlled to 1/9 sec, where one of the two conditions is that the output from the gyro sensor 307 is larger than the first threshold and the other of the two conditions is that the magnitude of the motion vector is larger than the second threshold.

Either one of the change of the continuous shooting interval based on the detection of the panning based on the output from the gyro sensor (the motion amount of the camerawork) and the change of the continuous shooting interval based on the motion amount of the subject (the motion vector) detected from the image may be carried out.

Further, the continuous shooting interval is switched in two steps between 1/3 sec and 1/9 sec, but may be switched in three or four steps. In this case, a plurality of first thresholds or a plural of second thresholds may be provided. Further, the continuous shooting interval may be continuously changed based on the output 407 from the gyro sensor 307 or the magnitude of the motion vector. 1/3 sec and 1/9 sec as the continuous shooting intervals are only examples. Needless to say, another continuous shooting interval may be applied. The motion vector may be calculated precisely based on the difference between image data, or may be calculated simply based on a difference in a brightness distribution between the image data.

As to a method for calculating the motion vector, when the continuous shooting interval is long, the motion vector can be calculated based on not image data generated by image capturing operation due to the continuous shooting, but an image signal output from the CCD image sensor 301 in order to display the image on the LCD monitor 104 at the predetermined time interval. This will be detailed below.

In general, the digital still camera in the recording mode continuously displays an image on the LCD monitor based on the image signal output from the imaging device until the shutter button is fully pressed. An image based on an image signal output from the imaging device is displayed on the LCD monitor at the predetermined time interval (for example, 1/30 sec or 1/60 sec), and thus the user can determine a composition of a photograph while viewing the LCD monitor.

A number of pixels on the LCD monitor is far smaller than a number of effective pixels on the imaging device. Although the number of pixels on the LCD monitor is several hundred thousands at most, the number of pixels on the imaging device is more than 10 million. Therefore, when the image based on the image signal output from the imaging device is continuously displayed on the LCD monitor, pixel data is read from not all the effective pixels on the imaging device, but pixel data from a part of effective pixels are thinned out to be read (thinned-out reading), or pixel data of a plurality of effective pixels are mixed to be read (pixel-mixed reading). As a result, a time required for reading the pixel data can be shortened, and a time required for processing the image signal formed by the pixel data and displaying it on the LCD monitor can be also shortened. The same is true on the digital still camera 100 according to the first embodiment.

On the other hand, for the motion vector calculating method based on the difference between image data generated by the image capturing operation in the continuous shooting operation, when the continuous shooting interval is long, it may be impossible to track a rapid motion of the subject. Further, when the continuous shooting interval is long, an image based on the image signal output from the CCD image sensor 301 can be displayed on the LCD monitor 104 at a predetermined time interval between one image capturing operation and the next image capturing operation.

Therefore, when the continuous shooting interval long, the motion vector can be calculated based on the difference between the image signals output from the CCD image sensor 301 in order display the image on the LCD monitor 104 at the predetermined time interval. With this arrangement, even when the continuous shooting interval is long, when the subject moves rapidly between one image capturing operation and the next image capturing operation, the continuous shooting interval can be shortened without waiting for the next image capturing operation. Further, since the number of pixel data composing the image signal output from the CCD image sensor 301 to display the pixel data on the LCD monitor 104 at the predetermined time interval is small, the time for calculating the motion vector can be shortened.

3-3. Display of Representative Image

The digital still camera 100 according to the first embodiment has a function for extracting some representative images from a plurality of image data continuously shot and displaying them on the LCD monitor 104 or an external display device. This function enables the user to easily view the representative images in a series of continuously shot images, and to easily understand contents of the series of continuously shot images.

Such a displaying operation will be described below with reference to FIGS. 7A to 7D. FIG. 7A is a diagram illustrating a structure of Exif data (details will be describe later) to be recorded in association with image data by the digital still camera 100. FIG. 7B is a diagram illustrating image data captured in the high-speed continuous shooting mode. FIG. 7C is a diagram illustrating representative image data. FIG. 7D is a diagram illustrating a state that the digital still camera 100 is connected to the display device via an HDMI cable.

The digital still camera 100 according to the first embodiment records the continuously shot image data as an image file complying with an Exif (Exchangeable Image File Format) standard. Exif is one of the standards of image files. The image file according to the Exif standard has a header section and a data section. Metadata is recorded in the header section, and image data is recorded in the data section.

FIG. 7A is a diagram illustrating a structure of Exif data 501 which is metadata to be recorded in the header section of the image file by the digital still camera 100. The digital still camera 100 compresses image data generated in the high-speed continuous shooting mode according to a JPEG format, and records the compressed image data in the data section of the image file. Further, the digital still camera 100 records metadata corresponding to the image data as the Exif data 501 in the header section. In such a manner, the digital still camera 100 creates image files for all image data captured in the high-speed continuous shooting mode.

The Exif data 501 will be described. In FIG. 7A, "normal data" is one of metadata specified by the Exif standard. Information specific to a manufacturer can be recorded in the header section separately from the "normal data". The digital still camera 100 according to the first embodiment records the following information as the information specific to a manufacturer.

(1) Continuous shooting: information representing whether image data is captured in the high-speed continuous shooting mode.

(2) Continuous shooting number: information representing what number image data is recorded in the high-speed continuous shooting mode.

(3) Continuous shooting interval: information representing the continuous shooting interval when image data is captured.

"(1) continuous shooting" is information representing whether image data is captured in the high-speed continuous shooting mode, which is binary information. In "(2) continuous shooting number", "1" is recorded to image data first captured in the high-speed continuous shooting mode, and "2" is recorded in secondary captured image data. Hereinafter, continuous integer values are recorded based on an order that image data is recorded. The continuous shooting interval of after capturing of the image data and before capturing of next image data is recorded in "(3) continuous shooting interval". In the digital still camera 100 according to the first embodiment, the continuous shooting interval is either one of 1/3 sec and 1/9 sec.

FIG. 7B is a diagram illustrating image data continuously shot in the state shown in FIGS. 3A to 3C. In this example, the continuously shot image data includes eighteen shots. In FIG. 7B, innermost image data is first-captured image data, and nearest image data is eighteenth-captured image data. The digital still camera 100 can extract representative image data from these image data. For example, as shown in FIG. 7C, it is possible to extract image data 503 captured first in the continuous shooting, image data 506 captured last in the continuous shooting, and image data 504 and 505 captured just after change of the continuous shooting intervals.

In the first embodiment, "(1) continuous shooting", "(2) Continuous shooting number", and "(3) continuous shooting interval" are recorded in the header section of an image file generated in the high-speed continuous shooting mode. Referring to these pieces of information, the CPU 305a can easily extract the image data 503 captured first in the continuous shooting, the image data 506 captured last in the continuous shooting, and the image data 504 and 505 captured just after change of the continuous shooting interval.

In the image data 503 captured first in the continuous shooting, "YES" is recorded in "(1) continuous shooting" of the header section, and "1" is recorded in "(2) continuous shooting number" of the header section. The image data captured just after the continuous shooting interval changes can be identified by checking "(3) the continuous shooting interval" of the header section in order of "(2) continuous shooting number" of the header section in the respective image file. For example, the image data 504 captured just after the continuous shooting interval firstly changes can be detected when "(3) continuous shooting interval" recorded in the header section changes from "1/3 sec" to "1/9 sec". The image data 505 captured just after the continuous shooting interval changes next can be detected when "(3) continuous shooting interval" in the header section changes from 1/9 sec" to "1/3 sec". In the image data 506 captured last in the continuous shooting, "YES" is recorded in "(1) continuous shooting" in the header section, and a maximum value ("18" in the example shown in FIGS. 7A to 7D) is recorded in "(2) continuous shooting number" in the header section.

In the above manner, the digital still camera 100 according to the first embodiment can extract, as the representative image data, the images firstly and last recorded in the continuous shooting, and an important image that is captured when the subject 401 is passing in front of the user 402, and display a list (thumbnail display) of these images or sequentially these images on the LCD monitor 104. As a result, the user can easily retrieve desired images from the plurality of continuously shot images.

The above example illustrates the case where image data captured when the continuous shooting interval changes is extracted as the representative image. However, image data between the image data 504 recorded when the continuous shooting interval firstly changes and the image data 505 recorded when the continuous shooting interval changes next may be extracted as the representative image data. As shown in FIGS. 7A to 7D, the image data 504 recorded when the continuous shooting interval changes firstly is the fourth captured image data, and the image data recorded when the continuous shooting interval changes next is the sixteenth recorded image data. In this case, for example, the tenth recorded image data ((4+16)÷2=10) may be the representative image data.

3-4. Reproduction of Slide Show

An operation in this case will be described, in which the digital still camera 100 is connected to a display device such as a thin-screen television via the HDMI cable, and a slide show is reproduced on the display device.

HDMI (High-Definition Multimedia Interface) is an interface standard for digital appliances. With the digital still camera connected to a flat-screen television via the HDMI cable, still images and moving images recorded in the digital still camera can be enjoyed on a large screen of the flat-screen television.

As shown in FIG. 7D, the digital still camera 100 is connected to a display device 507 of a flat-screen television via an HDMI cable 508. The digital still camera 100 transmits image data to be reproduced as a slide show to the display device 507 via the HDMI cable 508. Particularly when a slide show is reproduced, the CPU 305a controls display time of the image data according to a value represented by "(3) continuous shooting interval" (1/3 sec or 1/9 sec) recorded in the Exif data 501, and generates a video signal to output it to the display device 507 so that the image data is reproduced at the same interval as that on recording the image. The images reproduced in such a manner can be viewed similarly to moving images. Further, the CPU 305a may control reproducing time of the respective images to time that is obtained by multiplying the time (1/3 sec or 1/9 sec) represented by "(2) the continuous shooting interval" recorded in the Exif data 501 by N or 1/N (N: natural number). As a result, N-times high-speed reproducing and 1/N-times slow-motion reproducing can be realized. Further, only an image based on the representative image data may be displayed on the display device 507. In the slide-show reproducing, it goes without saying that the image is displayed not only on the display device 507, but also on the LCD monitor 104 of the digital still camera 100.

4. Conclusion

The digital still camera 100 according to the first embodiment is the imaging apparatus having the continuous shooting function. The digital still camera 100 has the CCD image sensor 301 for generating an image signal based on an optical signal of a subject, the gyro sensor 307 and the vibration detector 305c for detecting a motion speed of the digital still camera 100, and the CPU 305a. The CPU 305a controls the shooting interval in the continuous shooting operation based on the detected result of the gyro sensor 307 and the vibration detector 305c, so that the shooting interval, in the continuous shooting operation in the case where the motion speed of the digital still camera 100 is larger than a predetermined value, is shorter than the shooting interval in the case where the motion speed of the digital still camera 100 is lower than the predetermined value.

With the above configuration, the continuous shooting interval (the imaging interval in the continuous shooting operation) can be controlled suitably according to the panning (motions of the imaging apparatus) or the motion of the subject in the images. Concretely, when the motion speed of the digital still camera 100 (the panning speed) is higher than a predetermined value, the shooting interval is shortened. When the motion speed is lower than the predetermined value, the imaging interval is lengthened. Such a control of the shooting interval enables the continuous shooting suitably which tracks tine motion of the subject when the moving subject is continuously shot. This can provide the imaging apparatus which can reduce a miss of a best shot and ensure a photo opportunity. Images are captured at the high continuous shooting speed only when it is required, and thus a number of images to be recorded is reduced, so that a burden on the user at the time of retrieving a desired image after the image shooting can be reduced.

The information relating to the continuous shooting interval and the panning is recorded in the header section of an image file. By referring to the information, the representative images can be easily selected, so that a convenience for retrieving and viewing images for the user can be improved. When there is no (or a little) panning or the motion of image, the continuous shooting interval is lengthened. This can reduce the unnecessary imaging process and power consumption, so that a battery consumption is repressed. Further, the capacity of the recording medium to be used for recording images can be saved.

Second Embodiment

Basic configuration of the digital still camera according to a second embodiment is the same as that of the first embodiment. In the second embodiment, the imaging optical system 101 includes a zoom lens capable of moving forward and backward along an optical axis. By the zoom lens moving forward and backward in the optical axis, a focal distance of the imaging optical system 101 can be changed. In this point, the second embodiment is different from the first embodiment.

The digital still camera according to the second embodiment normalizes the change in the continuous shooting interval based on the panning speed (the motion amount of the camerawork) according to the focal distance of the imaging optical system 101. This point will be described in more detail below. The focal distance described below is a focal distance equivalent to that of a film camera of 35 mm.

The gyro sensor 307 outputs angular velocity of the digital still camera 100. Even if the panning is carried out at the same angular velocity (for example, 10°/sec), the panning speed (a change in speed of image data) varies according to the focal distance of the imaging optical system 101. This will be described with reference to FIGS. 8A and 8B.

Figure 8B:
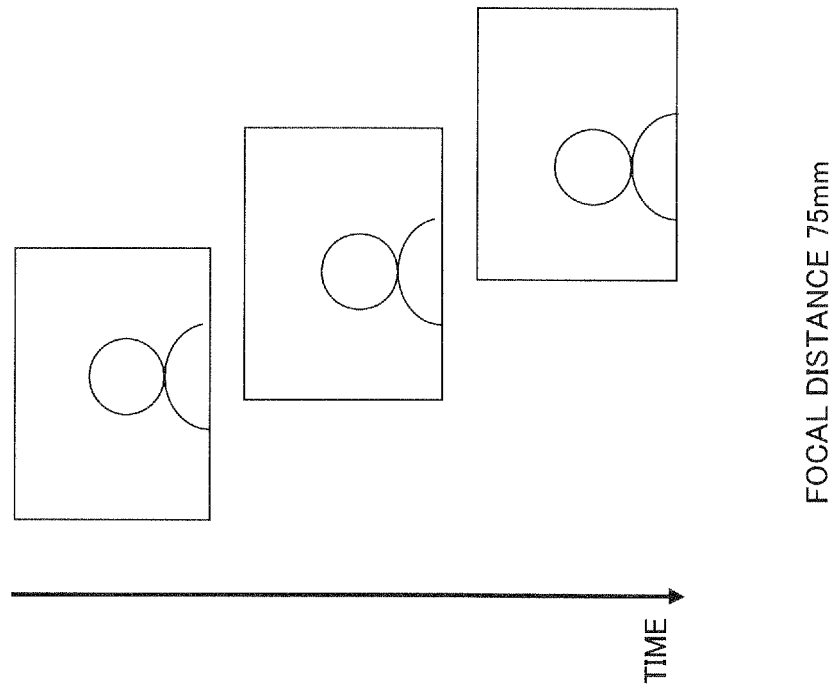
FIGS. 8A and 8B are diagrams for describing examples where a change in the continuous shooting interval based on the panning speed (the motion amount of the camerawork) is normalized according to a focal distance.
Figure 8A:
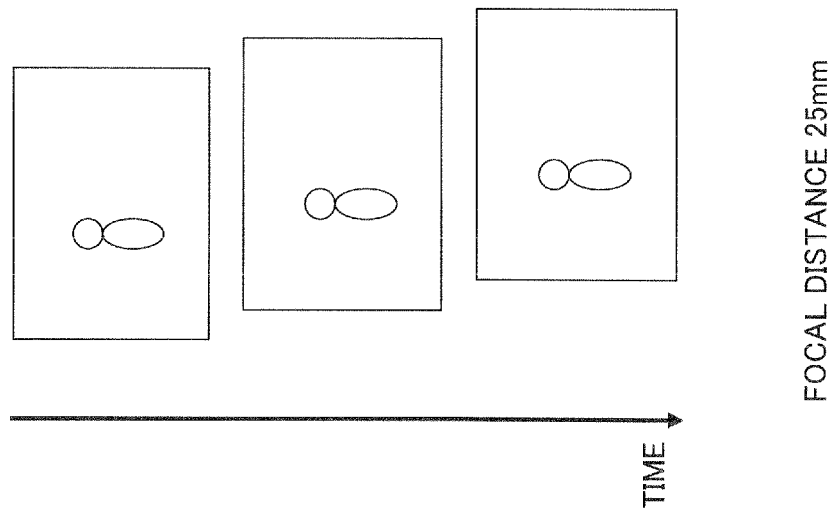

FIGS. 8A and 8B are diagrams for describing the normalization of the change in the continuous shooting interval. FIG. 8A illustrates a case where the focal distance of the imaging optical system 101 is 25 mm, namely, at a wide-angle end, and FIG. 8B illustrates a case where the focal distance of the imaging optical system 101 is 75 mm, namely, at a telephoto end. Both FIGS. 8A and 8B show time passage from up to down, a person as the subject moving from left to right, with the digital still camera panning from left to right to track the person as the subject. Even if the panning is carried out at the same angular velocity for the same time, as shown in FIG. 8B, the panning speed is higher when the focal distance of the imaging optical system 101 is the longer. Therefore, it is preferable to set the continuous shooting interval when the focal distance of the imaging optical system 101 is longer (see FIG. 8B) to be shorter than that when the focal distance of the imaging optical system 101 is shorter (see FIG. 8A) even if the panning is carried out at the same angular velocity.

Therefore, the continuous shooting intervals for the focal distances of the imaging optical system 101 other than 25 mm is normalized with respect to the continuous shooting interval for the focal distance of 25 mm, namely, at wide-angle end. For example, the continuous shooting interval for the focal distance of the imaging optical system 101 of 25 mm, namely, at the wide-angle end, is set to "1", and the continuous shooting interval for the focal distance of the imaging optical system 101 of 75 mm, namely, at the telephoto end, is set to "1/3". As a result, when the continuous shooting interval for the focal distance of the imaging optical system 101 of 25 mm, namely, at the wide-angle end, is set to 3 shots/sec, the continuous shooting interval for the focal distance of the imaging optical system 101 of 75 mm, namely, at the telephoto end, is 9 shots/sec.

In normalization of the continuous shooting interval for the focal distance of the imaging optical system 101 other than 25 mm, with respect to the continuous shooting interval for the focal distance of 25 mm, namely, at the wide-angle end, the continuous shooting interval may be determined so that the shooting operation is performed once at every panning of a certain amount (for example, 1/4 of the width of the image data) regardless of the focal distance of the imaging optical system 101.

In the digital still camera according to the second embodiment, it goes without saying that Exif data can be recorded, the representative images can be reproduced, and a slide show can be reproduced by the similar methods as those in the first embodiment.

Other Embodiments

The following modified examples can be considered in the above embodiments.

(1) In the above embodiments, the motion of the digital still camera 100 (the motion amount in unit time), namely, the panning speed is determined based on the output from the gyro sensor 307, but not limited to this. That is to say, another sensor may be used as long as it can detect a magnitude of the motion of the digital still camera 100 per unit time. For example, an acceleration sensor may be used instead of the gyro sensor.

(2) In the above embodiments, the motion vector is detected in the control of the continuous shooting interval based on the motion amount of the subject, but instead of this, a motion of an image may be detected based on a change in brightness.

Specifically, the motion of the image is detected based on the change in the brightness between images captured temporarily and continuously. More specifically, an entire region of an image is divided into a plurality of blocks, and a difference in the brightness between the images is obtained in each block. A number of blocks of which difference in the brightness is larger than a threshold is obtained. When the obtained number of blocks is larger than a predetermined value, a determination can be made that a big change occurs between images. Therefore, when the obtained number of blocks is larger than the predetermined value, namely, when the determination is made that the big change occurs between images, the continuous shooting interval may be reduced (similarly to the process done for the large motion vector). On the other hand, when the obtained number of blocks is smaller than the predetermined value, namely, when the determination is made that the big change does not occur between images, the continuous shooting interval may be increased. The brightness in each block can be obtained as an average value of the brightness of pixels in each block. Such detection of image motion based on the brightness provides high tolerance for noise and enables stable detection of the motions.

INDUSTRIAL APPLICABILITY

According to the above embodiments, the continuous shooting interval (the interval of capturing an image in the continuous shooting operation) can be switched according to the motion of the imaging apparatus (panning). Therefore, even if the imaging apparatus is panned quickly at the continuous shooting, images are captured at a suitable imaging interval so that a miss of the photo opportunity can be reduced. Therefore, the concept of the above embodiments can be applied to an imaging apparatus having a continuous shooting function for still images, such as digital still cameras, movie cameras, and mobile phones.

What is claimed is:

1. An imaging apparatus having a continuous shooting function, comprising:
   an imaging unit configured to generate an image signal based on an optical signal of a subject;
   an input device configured to receive an operation by a user, wherein the continuous shooting function is performed to capture a plurality of images after the input device is operated and until the operation is released;
   a storage unit configured to store an image file based on the image signal;
   a first detector configured to detect a motion of the imaging apparatus; and
   a controller configured to control a capturing interval of the imaging unit for capturing an image in a continuous shooting operation based on a detecting result of the first detector so that the capturing interval for a magnitude of the motion of the imaging apparatus which is larger than a predetermined value is shorter than the capturing interval for the magnitude of the motion of the imaging apparatus which is smaller than the predetermined value;
   wherein the controller is operable to use both the shorter and larger capturing intervals when the first detector detects the larger and smaller magnitudes of motion of the imaging apparatus after the input device is operated and before the operation is released.

2. The imaging apparatus according to claim 1, wherein the image file includes a data section and a header section, the controller generates the image file by storing image data based on the image signal in the data section and storing information relating to the capturing interval at generating the image signal in the header section, and stores the generated image file in the storage unit.

3. The imaging apparatus according to claim 2, further comprising a display unit configured to display the image based on the image signal,
   wherein at reproducing of a series of image signals which are continuously generated by the continuous shooting function, the controller controls the display unit to sequentially display at least a part of all images based on the series of image signals at the same capturing interval as the capturing interval at generating the image signals.

4. The imaging apparatus according to claim 3, wherein the at least a part of all images include an image based on an image signal generated first in the plurality of images based on the series of image signals continuously generated by the continuous shooting function, an image based on an image signal generated last and an image based on an image signal generated when the capturing interval changes.

5. The imaging apparatus according to claim 2, further comprising an output unit configure to output a video signal based on the image signal,
   wherein the controller generates a video signal based on the image signal so that, when the series of image signals continuously generated by the continuous shooting function is output, at least a part of all images based on the series of image signals are displayed at the same capturing interval as the capturing interval at generating the image signals, and outputs the generated video signal to the output unit.

6. The imaging apparatus according to claim 5, wherein the at least a part of all images include an image based on an image signal generated first in the plurality of images based on the series of image signals continuously generated by the continuous shooting function, an image based on an image signal generated last and an image based on an image signal generated when the capturing interval changes.

7. The imaging apparatus according to claim 2, further comprising an optical system having a variable focal distance,
   wherein the controller further controls the predetermined value so that the longer the focal distance of the optical system at the continuous shooting operation is, the smaller the predetermined value is.

8. The imaging apparatus according to claim 1, further comprising a second detector configured to detect a difference between images represented by image signals which are generated temporarily and continuously,
   wherein the controller controls the capturing interval in the continuous shooting operation based on a detecting result of the second detector so that the capturing interval of the imaging unit in the continuous shooting operation when the difference between the images is larger than a predetermined value is shorter than the capturing interval when the difference between the images is smaller than the predetermined value.

9. The imaging apparatus according to claim 8, wherein the imaging unit selectively generates a first image signal representing an image with a first size and a second image signal representing an image with a second size smaller than the first size, and
   the second detector detects a motion of the subject based on the image represented by the second image signal.

10. The imaging apparatus according to claim 1, further comprising a display unit configured to display the image based on the image signal,
    wherein at reproducing of a series of image signals which are continuously generated by the continuous shooting function, the controller controls the display unit to sequentially display at least a part of all images based on the series of image signals at the same capturing interval as the capturing interval at generating the image signals.

11. The imaging apparatus according to claim 10, wherein the at least a part of all images include an image based on an image signal generated first in the plurality of images based on the series of image signals continuously generated by the continuous shooting function, an image based on an image signal generated last and an image based on an image signal generated when the capturing interval changes.

12. The imaging apparatus according to claim 1, further comprising an output unit configure to output a video signal based on the image signal, wherein the controller generates a video signal based on the image signal so that, when the series of image signals continuously generated by the continuous shooting function is output, at least a part of all images based on the series of image signals are displayed at the same capturing interval as the capturing interval at generating the image signals, and outputs the generated video signal to the output unit.

13. The imaging apparatus according to claim 12, wherein the at least a part of all images include an image based on an image signal generated first in the plurality of images based on the series of image signals continuously generated by the continuous shooting function, an image based on an image signal generated last and an image based on an image signal generated when the capturing interval changes.

14. The imaging apparatus according to claim 1, further comprising an optical system having variable focal distance, wherein the controller further controls the predetermined value so that the longer the focal distance of the optical system at the continuous shooting operation is, the smaller the predetermined value is.

15. An imaging apparatus having a continuous shooting function, comprising:
   an imaging unit configured to generate an image signal based on an optical signal of a subject;
   a storage unit configured to store an image file based on the image signal;
   a first detector configured to detect a motion of the imaging apparatus;
   a controller configured to control a capturing interval of the imaging unit for capturing an image in a continuous shooting operation based on a detecting result of the first detector so that the capturing interval for a magnitude of the motion of the imaging apparatus which is larger than a predetermined value is shorter than the capturing interval for the magnitude of the motion of the imaging apparatus which is smaller than the predetermined value; and
   an optical system having a variable focal distance,
   wherein the controller further controls the predetermined value so that the longer the focal distance of the optical system at the continuous shooting operation is, the smaller the predetermined value is.

16. An imaging apparatus having a continuous shooting function, comprising:
   an imaging unit configured to generate an image signal based on an optical signal of a subject;
   a storage unit configured to store an image file based on the image signal;
   a first detector configured to detect a motion of the imaging apparatus;
   a controller configured to control a capturing interval of the imaging unit for capturing an image in a continuous shooting operation based on a detecting result of the first detector so that the capturing interval for a magnitude of the motion of the imaging apparatus which is larger than a predetermined value is shorter than the capturing interval for the magnitude of the motion of the imaging apparatus which is smaller than the predetermined value; and
   an optical system having a variable focal distance,
   wherein the controller further controls the predetermined value so that the longer the focal distance of the optical system at the continuous shooting operation is, the smaller the predetermined value is;
   wherein the image file includes a data section and a header section; and
   wherein the controller generates the image file by storing image data based on the image signal in the data section and storing information relating to the capturing interval at generating the image signal in the header section, and stores the generated image file in the storage unit.

* * * * *